United States Patent
Sussmeier et al.

(10) Patent No.: US 7,847,509 B2
(45) Date of Patent: Dec. 7, 2010

(54) SYSTEM AND METHOD FOR CONTROLLING ELECTRIC MOTORS TO SIMULATE A MECHANICAL DIFFERENTIAL

(75) Inventors: John W. Sussmeier, Cold Spring, NY (US); Boris Rozenfeld, New Milford, CT (US); Arthur H. DePoi, Brookfield, CT (US); Anthony E. Yap, Southington, CT (US)

(73) Assignee: Pitney Bowes Inc., Stamford, CT (US)

( * ) Notice: Subject to any disclaimer, the term of this patent is extended or adjusted under 35 U.S.C. 154(b) by 377 days.

(21) Appl. No.: 11/964,087

(22) Filed: Dec. 26, 2007

(65) Prior Publication Data

US 2009/0167231 A1 Jul. 2, 2009

(51) Int. Cl.
*G05B 11/42* (2006.01)
(52) U.S. Cl. .................. 318/610; 318/609; 318/600; 318/560; 318/621; 318/632
(58) Field of Classification Search .......... 318/600, 318/609, 610, 621, 632
See application file for complete search history.

(56) References Cited

U.S. PATENT DOCUMENTS

| | | | | |
|---|---|---|---|---|
| 5,016,182 A | * | 5/1991 | Bergland et al. | 700/125 |
| 5,384,526 A | * | 1/1995 | Bennett | 318/610 |
| 5,394,323 A | * | 2/1995 | Yellowley et al. | 700/63 |
| 5,912,541 A | * | 6/1999 | Bigler et al. | 318/600 |
| 6,757,583 B2 | * | 6/2004 | Giamona et al. | 700/189 |
| 6,822,411 B2 | * | 11/2004 | Kobayashi | 318/560 |

* cited by examiner

*Primary Examiner*—Walter Benson
*Assistant Examiner*—David S Luo
(74) *Attorney, Agent, or Firm*—Brian A. Collins; Angelo N. Chaclas

(57) ABSTRACT

System and methods of controlling a plurality of motors based on a motor motion attribute, such as rotor position, velocity, or acceleration, which simulate the properties of a mechanical differential, including a pure differential, a limited slip differential, and/or a locking differential. The method may be employed in a number of applications, including, without limitation, a paper handling system, such as an inserter, to control the nips of a pinless cutter of an inserter, and in a vehicle.

14 Claims, 7 Drawing Sheets

| OUTPUT VELOCITIES | | AS A FUNCTION OF γ | | FOR γ = 0 | | FOR γ = 1 | |
|---|---|---|---|---|---|---|---|
| ω1 | ω2 | DAC1 | DAC2 | DAC1 | DAC2 | DAC1 | DAC2 |
| 0.0 | 2.0 | 2.0 | 0.0 | 1.0 | 1.0 | 2.0 | 0.0 |
| 0.1 | 1.9 | 1.9 | 0.1 | 1.0 | 1.0 | 1.9 | 0.1 |
| 0.2 | 1.8 | 1.8 | 0.2 | 1.0 | 1.0 | 1.8 | 0.2 |
| 0.3 | 1.7 | 1.7 | 0.3 | 1.0 | 1.0 | 1.7 | 0.3 |
| 0.4 | 1.6 | 1.6 | 0.4 | 1.0 | 1.0 | 1.6 | 0.4 |
| 0.5 | 1.5 | 1.5 | 0.5 | 1.0 | 1.0 | 1.5 | 0.5 |
| 0.6 | 1.4 | 1.4 | 0.6 | 1.0 | 1.0 | 1.4 | 0.6 |
| 0.7 | 1.3 | 1.3 | 0.7 | 1.0 | 1.0 | 1.3 | 0.7 |
| 0.8 | 1.2 | 1.2 | 0.8 | 1.0 | 1.0 | 1.2 | 0.8 |
| 0.9 | 1.1 | 1.1 | 0.9 | 1.0 | 1.0 | 1.1 | 0.9 |
| 1.0 | 1.0 | 1.0 | 1.0 | 1.0 | 1.0 | 1.0 | 1.0 |
| 1.1 | 0.9 | 0.9 | 1.1 | 1.0 | 1.0 | 0.9 | 1.1 |
| 1.2 | 0.8 | 0.8 | 1.2 | 1.0 | 1.0 | 0.8 | 1.2 |
| 1.3 | 0.7 | 0.7 | 1.3 | 1.0 | 1.0 | 0.7 | 1.3 |
| 1.4 | 0.6 | 0.6 | 1.4 | 1.0 | 1.0 | 0.6 | 1.4 |
| 1.5 | 0/5 | 0/5 | 1.5 | 1.0 | 1.0 | 0/5 | 1.5 |
| 1.6 | 0.4 | 0.4 | 1.6 | 1.0 | 1.0 | 0.4 | 1.6 |
| 1.7 | 0.3 | 0.3 | 1.7 | 1.0 | 1.0 | 0.3 | 1.7 |
| 1.8 | 0.2 | 0.2 | 1.8 | 1.0 | 1.0 | 0.2 | 1.8 |
| 1.9 | 0.1 | 0.1 | 1.9 | 1.0 | 1.0 | 0.1 | 1.9 |
| 2.0 | 0.0 | 0.0 | 2.0 | 1.0 | 1.0 | 0.0 | 2.0 |

SYSTEM AND METHOD FOR CONTROLLING ELECTRIC MOTORS TO SIMULATE A MECHANICAL DIFFERENTIAL

FIELD OF THE INVENTION

The present invention relates to motor controls and, in particular, to a motor control system and method for controlling a plurality of electric motors used in a variety of applications, such as, without limitation, paper handling, automotive, and robotic applications, in a manner that provides functionality similar to that provided by a traditional mechanical differential.

BACKGROUND OF THE INVENTION

Mechanical differential gear trains, typically referred to as mechanical differentials or simply differentials, are commonly used in many machines, particularly in powered vehicles. The primary purpose of a mechanical differential is to divide torque equally between two driving wheels to permit the wheels to rotate at different velocities when the vehicle turns. Differentials have one input shaft and two output shafts, whereby the input shaft is typically driven by a power source, such as a motor or an engine.

Mechanical differentials exhibit two important properties. First, a mechanical differential causes equal torque to be applied to both output shafts at all times. Second, when a mechanical differential is employed, the average of the two output shaft velocities is always proportional to the input shaft velocity. Therefore, if the input shaft is held fixed, the two output shafts are able rotate at equal velocities but in opposite direction. Similarly, if the first output shaft is held fixed while the input shaft is rotating, the second output shaft will rotate at twice the velocity then it would have if the first output shaft were allowed to rotate at equal velocity to the second output shaft.

Mechanical differentials have a number of drawbacks. For example, mechanical differentials are subject to wear and power loss through the gear sets. In addition, mechanical differentials are not well suited for rapid, incremental motion applications because of the introduction of additional inertial loading due to the gear sets themselves, as well as the inevitable backlash introduced by the gear sets as they wear due to bi-directional loading.

Electric motor systems that employ position control to enable an electric motor to drive a load are well known in the motion control industry. An example prior art motor system 1 is shown in block diagram form in FIG. 1. As seen in FIG. 1, the motor system 1 includes a motor control subsystem 5, which, as described in greater detail below, controls the operation of an electric motor 30, which in turn drives a mechanical load 35. The motor 30 is what is commonly referred to as a servo motor. A servo motor, as that term is used herein, refers to a motor that is controlled based on a closed feedback loop, wherein the feedback is in the form of some motion parameter or attribute of the motor such as rotor position (i.e., angular position), rotor velocity, or rotor acceleration.

As seen in FIG. 1, the motor control subsystem 5 includes a motion profile generator 10, a summing junction 15, a digital filter 20, a power stage 25, and an encoder 40. The motion profile generator 10 generates and outputs a motion profile which is designed to selectively control the angular velocity of the rotor of the motor 30 by controlling the angular position of the rotor over some period of time. In particular, in the embodiment shown in FIG. 1, at some periodic rate (e.g., every 500 microseconds), the motion profile generator 10 injects a desired rotor position into the summing junction 15. The actual rotor position of the motor 30, as provided by the encoder 40 as described below, is subtracted from the desired position to provide a position error. The position error is injected into the digital filter 20 which in turn outputs a DAC (digital to analog converter) value.

In the industry, the digital filter 20 is most commonly a PID (proportional, integral, derivative) controller. It should be appreciated, however, that the digital filter 20 can be any suitable algorithm that converts position error into a DAC value that gets injected into the power stage 25 (also referred to as an amplifier or drive). The output of the power stage 25 is typically electrical current (but can be a voltage) that is provided to the motor 30 that ultimately provides the desired quality of motion at the mechanical load 35. The DAC value is scaled accordingly to match the inputs and outputs of the power stage 25. For example, many commercially available amplifiers use ±10VDC as an acceptable analog input signal. The power stage 25 converts this input signal into and outputs a winding current that is proportional to the input signal.

In lieu of an analog output, the digital filter 75 may output a digital value whereby the power stage 25 can accept this digital value and accomplish the same as the analog version. The winding current is delivered to the motor 30 and is typically proportional to the output torque of the motor 30. This ultimately provides motion to the mechanical load 35. An encoder 40, or other suitable feedback device, is located somewhere on the motor shaft of the motor 30 or on the driven mechanism and provides the actual rotor position of the motor 30 back to the summing junction 15, completing the outer closed loop (the control loop within the power stage 25 is commonly referred to as the inner loop).

FIG. 2 is a block diagram of an implementation wherein the motor 30 of the motor system 1 shown in FIG. 1 is used to drive a mechanical differential 45 operatively coupled to first and second output shafts 50. As discussed elsewhere herein, mechanical differentials such as mechanical differential 45 exhibit two important properties. The first property is that equal torques are applied to both output shafts 50 at all times. Therefore, $\tau_1 = \tau_2$, where $\tau_1$ and $\tau_2$ are the output torques of the mechanical differential 45. The second property is that the average of the velocities of the output shafts 50 is always proportional to the input shaft velocity (provided by the motor 30). Therefore, $\omega_i = c^*(\omega_1 + \omega_2)/2$, where $\omega_i$ equals the input velocity to the mechanical differential 45, $\omega_1$ and $\omega_2$ are the respective output velocities of the output shafts 50, and c is a proportionality constant related to internal gearing/arm ratios within the mechanical differential 45.

As described above, mechanical differentials, such as mechanical differential 45, have a number of drawbacks. Therefore, it would be beneficial to provide the functionality of mechanical differentials in a manner in which the drawbacks of mechanical differentials were eliminated.

SUMMARY OF THE INVENTION

In one embodiment, the invention provides a method of controlling a plurality of motors based on a motor motion attribute, such as rotor position, velocity, or acceleration, which simulates the properties of a mechanical differential. Each of the motors is driven by a corresponding power stage using an output such as a winding current or voltage. The method includes generating a single desired value of the motor motion attribute for the plurality of motors, determining a current actual value of the motion attribute for each of the motors, and generating an attribute error based on the desired value and an average of the current actual values, using, for example, a summing junction. The method further includes generating a correction value based on at least the attribute error, providing the correction value to each of the power stages, generating in each of the power stages an output for driving the corresponding motor using the correction value, and driving each of the motors using the output generated for the motor. In one particular embodiment, the correction value may be generated by a PID controller.

In another embodiment, the invention provides a motor system that includes a plurality of motors, such as DC or AC brushless motors, wherein each of the motors is driven by a corresponding power stage, and a processing device operatively coupled to each of the power stages. The processing device, such as a real time processor, is adapted to control the motors based on a motor motion attribute, such as rotor position, velocity, or acceleration, by generating a single desired value of the motor motion attribute for the plurality of motors, determining a current actual value of the motion attribute for each of the motors, generating an attribute error based on the desired value and an average of the current actual values, generating a correction value based on at least the attribute error, providing the correction value to each of the power stages. Each of the power stages then generates an output for driving the motor corresponding to the power stage using the correction value, wherein each of the motors is driven using the output generated for the motor.

In yet another embodiment, the invention relates to a paper handling system, such as an inserter system, that includes a plurality of control nips for moving paper, a plurality of motors driven by a corresponding power stage, wherein each of the motors drives a respective one of the control nips, and a processing device operatively coupled to each of the power stages. The processing device, such as a real time processor, is adapted to control the motors, and therefore the control nips, based on a motor motion attribute, such as rotor position, velocity, or acceleration attribute, by generating a single desired value of the motor motion attribute for the plurality of motors, determining a current actual value of the motion attribute for each of the motors, generating an attribute error based on the desired value and an average of the current actual values, generating a correction value based on at least the attribute error, providing the correction value to each of the power stages. Each of the power stages then generates an output for driving the motor corresponding to the power stage using the correction value, wherein each of the motors is driven using the output generated for the motor. The paper handling system may includes a pinless cutter having a blade, wherein the control nips are part of the pinless cutter, wherein the paper is a web of paper, and wherein the control nips when being driven by the motor move the web of paper into a position to be cut by the blade.

In still another embodiment, the invention relates to a vehicle that includes a plurality of wheels, a plurality of motors driven by a corresponding power stage, wherein each of the motors drives a respective one of the wheels, and a processing device operatively coupled to each of the power stages. The processing device, such as a real time processor, is adapted to control the motors, and therefore each of the wheels, based on a motor motion attribute, such as rotor position, velocity, or acceleration attribute, by generating a single desired value of the motor motion attribute for the plurality of motors, determining a current actual value of the motion attribute for each of the motors, generating an attribute error based on the desired value and an average of the current actual values, generating a correction value based on at least the attribute error, providing the correction value to each of the power stages. Each of the power stages then generates an output for driving the motor corresponding to the power stage using the correction value, wherein each of the motors is driven using the output generated for the motor.

In another embodiment, the invention provides a method of controlling a plurality of motors based on a motor motion attribute, such as rotor position, velocity or acceleration, which simulates the properties of a mechanical limited slip and/or locking differential. The method includes generating a single desired value of the motor motion attribute for the plurality of motors, determining a current actual value of the motion attribute for each of the motors, generating an attribute error based on the desired value and an average of the current actual values, and generating an uncompensated correction value based on at least the attribute error. The method further includes determining an angular velocity of each of the motors, generating a compensated correction value for each of the power stages using at least the determined angular velocity of each of the motors, providing the corresponding compensated correction value to each of the power stages, generating in each of the power stages an output for driving the corresponding motor using the corresponding compensated correction value, and driving each of the motors using the output generated for the motor. In one example, a limited slip coefficient between 0 and 1 is used to generate each of the compensated correction values. When the limited slip coefficient is set to 1, the actual angular velocity of each of the motors resulting from the driving step will be equal, thereby performing like a locking differential. When the limited slip coefficient is set to a value between 0 and 1, the method provides the functionality of an adjustable limited slip differential.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings illustrate exemplary embodiments of the invention, and together with the general description given above and the detailed description given below, serve to explain the principles of the invention. As shown throughout the drawings, like reference numerals designate like or corresponding parts.

FIG. 5 is a table that shows tabulated relative output DAC values as a function of relative actual velocities of the output shafts of an embodiment of the invention;

DESCRIPTION OF EXEMPLARY EMBODIMENTS

Figure 3:
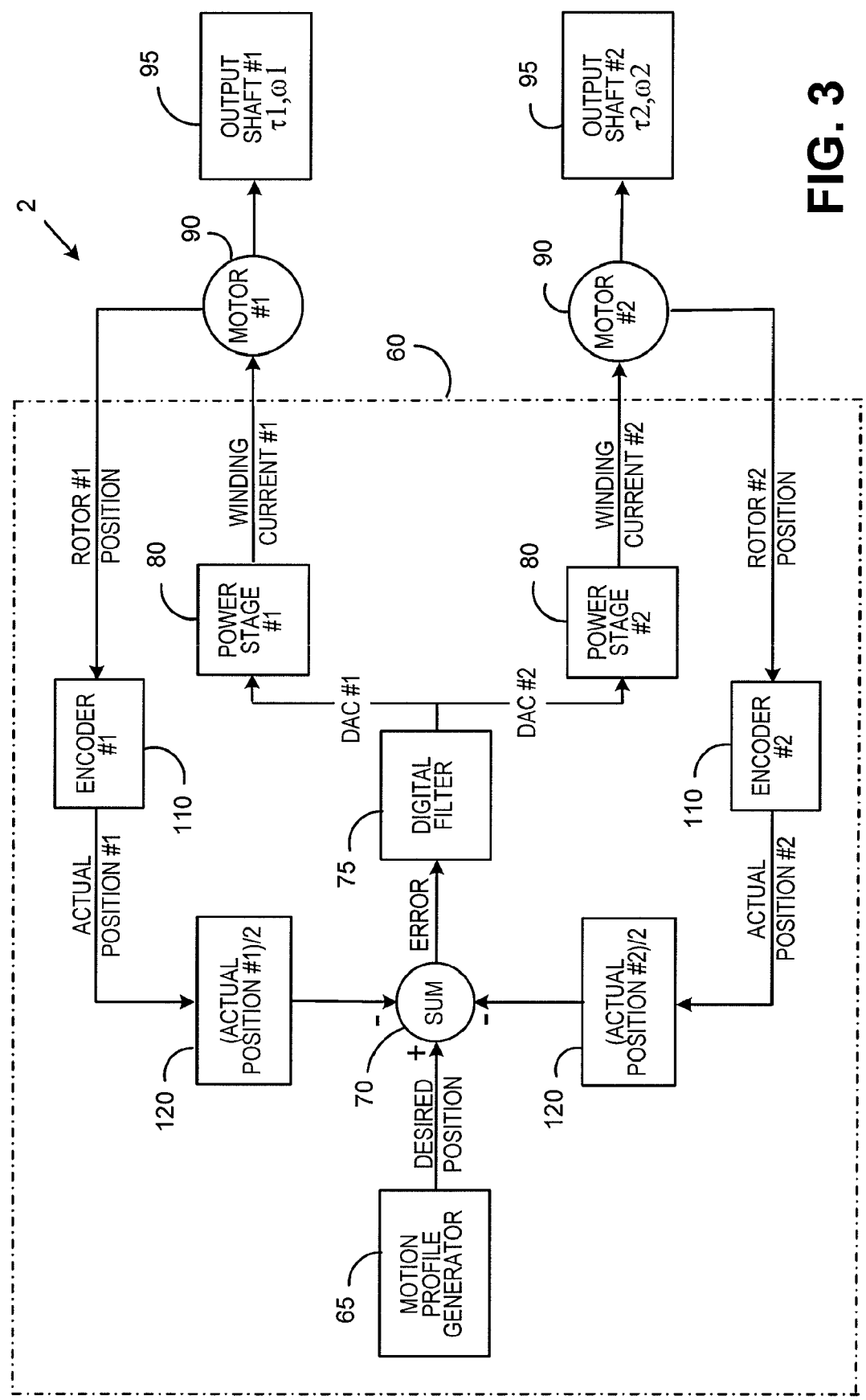
FIG. 3 is a is a block diagram of a motor system according to an embodiment of the present invention.

FIG. 3 is a block diagram of a motor system 2 according to an embodiment of the present invention. The motor system 2 includes a motor control subsystem 60 which, as described in greater detail below, controls the operation of first and second electric motors 90 which in turn drive respective first and second output shafts 95. The motors 90 are servo motors, such as DC or AC brushless motors. As discussed elsewhere herein, the term servo motor as used herein shall refer to a motor that is controlled based on a closed feedback loop, wherein the feedback is in the form of some motion parameter or attribute of the motor such as, without limitation, rotor position (i.e., angular position), rotor velocity, or rotor acceleration.

Figure 1:
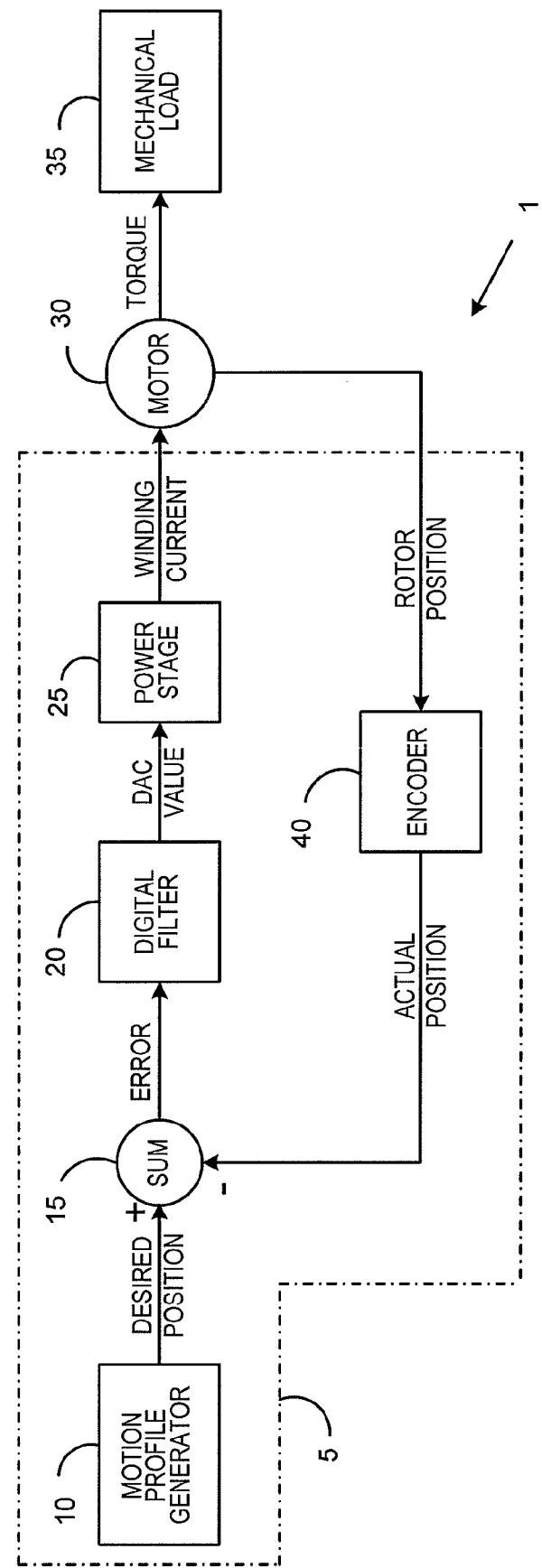
FIG. 1 a block diagram of a prior art motor system.
Figure 2:
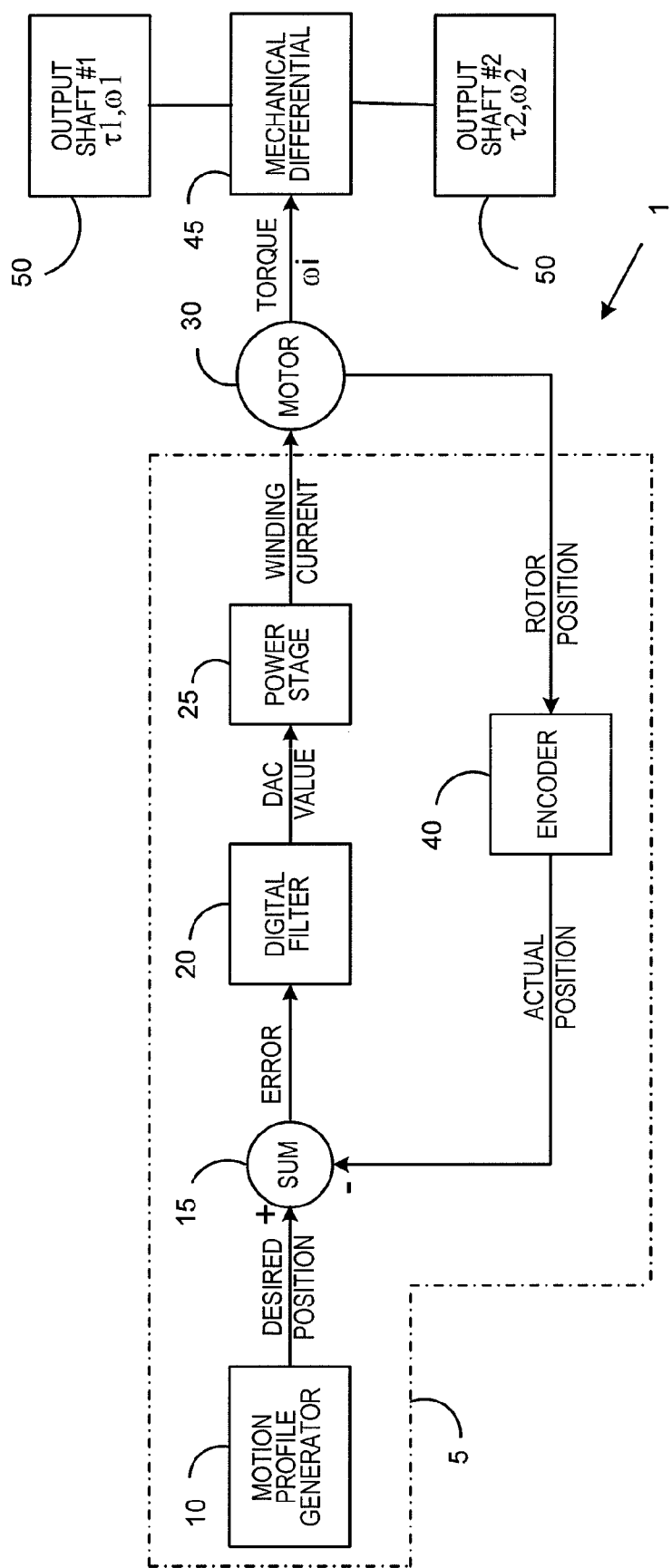
FIG. 2 is a block diagram of an implementation wherein the motor of the motor system shown in FIG. 1 is used to drive a mechanical differential.

The motor control subsystem 60 includes a motion profile generator 65, a summing junction 70, and a digital filter 75. These components are similar to the motion profile generator 10, summing junction 15, and digital filter 20 shown in FIGS. 1 and 2. As was the case with the digital filter 20 of the motor control subsystem 5 shown in FIGS. 1 and 2, the digital filter 75 may comprise a PID controller, but it should be understood that the digital filter 75 may alternatively be any suitable algorithm that converts position error into a DAC value appropriate for a power stage as described herein. In one embodiment, the motion profile generator 65, the summing junction 70, the digital filter 75, and the actual position dividers 120 (described below) are implemented within a real time processor, such as, without limitation, a microprocessor, a microcontroller, or some other suitable processing device.

The digital filter 75 is operatively coupled to first and second power stages 80. The first power stage 80 is operatively coupled to the first motor 90, which in turn is operatively coupled to the corresponding output shaft 95. Similarly, the second power stage 80 is operatively coupled to the second motor 90, which in turn is operatively coupled to the corresponding output shaft 95. An encoder 110 is operatively coupled to each motor 90 for determining the actual position of the rotor of the motor 90. The encoders 110 may alternatively be any suitable feedback device located somewhere on the shafts of the respective motors 90 or on the driven mechanism of the respective motors 90 that is capable of providing the actual rotor position in each case. The first encoder 110 provides an input into a first actual position divider 120 and the second encoder 110 provides an input into a second actual position divider 120, the functions of which are described below.

In operation, the motion profile generator 65, based on a motion profile that is designed to selectively control the angular velocity of the rotors of the motor 90, injects a desired rotor position into the summing junction 70 at some periodic rate. In the summing junction 70, the actual rotor position is subtracted from the desired rotor position to provide a position error. In the embodiment of the motor control subsystem 60 shown in FIG. 3, the actual position is the average actual position of the motors 90 as determined by the encoders 110 (i.e., [(actual position #1)+(actual position #2)]/2). In FIG. 3, this function is shown schematically in the form of the actual position dividers 120.

The position error that is generated by the summing junction 70 is injected into the digital filter 75. The digital filter 75 in this embodiment generates a DAC value based upon the position error it receives and provides that DAC value (i.e., the same value) to each of the power stages 80. The DAC value in this embodiment is computed and output at a selected periodic sampling rate. Each power stage 80 converts the DAC value it receives into a winding current that is provided to the respective motor 90. The winding current that is provided to each motor 90 is proportional to the input signal which is the DAC value. In addition, the winding current that is delivered to each motor 90 is also typically proportional to the output torque of each motor 90. The output of each motor 90 provides motion to the associated output shaft 95.

As will be appreciated from the above, the motion control subsystem 60 provides the first of the two important properties of differentials described elsewhere herein, namely that equal torques are applied to the output shafts 95 at all times. In particular, since by design the same DAC value is provided to both of the first motors 90, then the respective output torques, T1 and T2, of the two motors 90 are also equal (assuming identical transfer functions in both power stages 80 and in both motors 90).

It should be noted that in practice, small differences for the output torques T1 and T2 can be generated due to production tolerances in the power stages 80 and/or in the motors 90. For example, the torque constant of each motor 90 (output torque/input current) can vary on the order of ±10%. This effect can be compensated for by multiplying one of the DAC values by a proportionality constant before inputting it into the appropriate power stage 80 to ensure that nearly equal torques are generated by each motor 90 for the same original commanded DAC value. To determine the appropriate proportionality constant, both motors 90 can temporarily be coupled together and driven against one another near the rated continuous torque of each motor 90. The constant can be manipulated until the motors 90 cease to have motion. An alternative method is to accelerate each motor 90 and their respective loads (e.g., equal mass control nips described elsewhere herein) at a given constant DAC value and manipulate the proportionality constant until the accelerations of the output shafts 95 are matched.

As discussed above, the second important property of a mechanical differential is that the average of the two output shaft velocities is always proportional to the input shaft velocity. For a mechanical differential (such as mechanical differential 45 shown in FIG. 2), the physics of the mechanical differential 45 result in this property. For the motor control subsystem 60 shown in FIG. 3, since an input shaft does not physically exist, this second property may be simulated by maintaining the average of the velocities of the output shafts 95 (as measured by, for example, a tachometer) approximately proportional to the commanded velocity from the motion profile generator 65 (as will be appreciated, the commanded velocity is equal to the difference between consecutive desired rotor positions divided by the time interval between the two desired rotor positions). The step of injecting the average actual position, described elsewhere herein, into the summing junction 70 produces the same velocity averaging effect as is provided by a mechanical differential.

In the embodiment shown in FIG. 3, the feedback mechanism that is employed is rotor position. It will be appreciated that instead of rotor position, rotor velocity or another suitable motor motion parameter or attribute may be employed without departing from the scope of the present invention. For example, the motion profile generator 65 may periodically output a desired velocity, and the average the actual rotor velocities of the motors (as measured by respective tachometers) may be used as feedback and input into the summing junction.

The motor control subsystem of the present invention has successfully been demonstrated to exhibit the fundamental behaviors of a mechanical differential. For example, it has been demonstrated that if the commanded velocity is zero, simulating a mechanical differential input shaft that is held fixed, the two output shafts 95 can rotate at equal velocities but in opposite directions.

One possible application of the present invention is in an inserter system or similar paper handling system. Inserter systems are typically used by organizations such as banks, insurance companies, and utility companies for producing a large volume of specific mailings where the contents of each mail item are directed to a particular addressee. In many respects, a typical inserter system resembles a manufacturing assembly line. Sheets and other raw materials (e.g., enclosures and envelopes) enter the inserter system as inputs. Then, a plurality of different modules or workstations in the inserter system work cooperatively to process sheets until a finished mail piece is produced. Typically, inserter systems prepare mail pieces by gathering collations of documents on a conveyer. The collations are then transported on the conveyer to an insertion station where they are automatically stuffed into envelopes. After being stuffed with the collations, the envelopes are removed from the insertion station for further processing, such as automated closing and sealing of the envelope, weighing of the envelope, applying postage to the envelope, and finally sorting and stacking the envelopes.

At the input end of a typical inserter system, rolls or stacks of continuous printed documents, called a web, are fed into the inserter system by a web feeder. As will be appreciated, the continuous web must be separated into individual documents pages. This separation is typically carried out by a web cutter that uses a blade to cut the continuous web into individual document pages. In one particular type of web cutter, the continuous web is moved by a pair of control nips. Such a system is referred to as a pinless cutter, as the continuous web of material is not provided with sprocket holes on either side thereof, and the control nips lack tractor pins. The present invention, in one particular embodiment, employs the motor control subsystem 60 to control individual motors which drive the control nips of a pinless cutter.

Figure 4A:
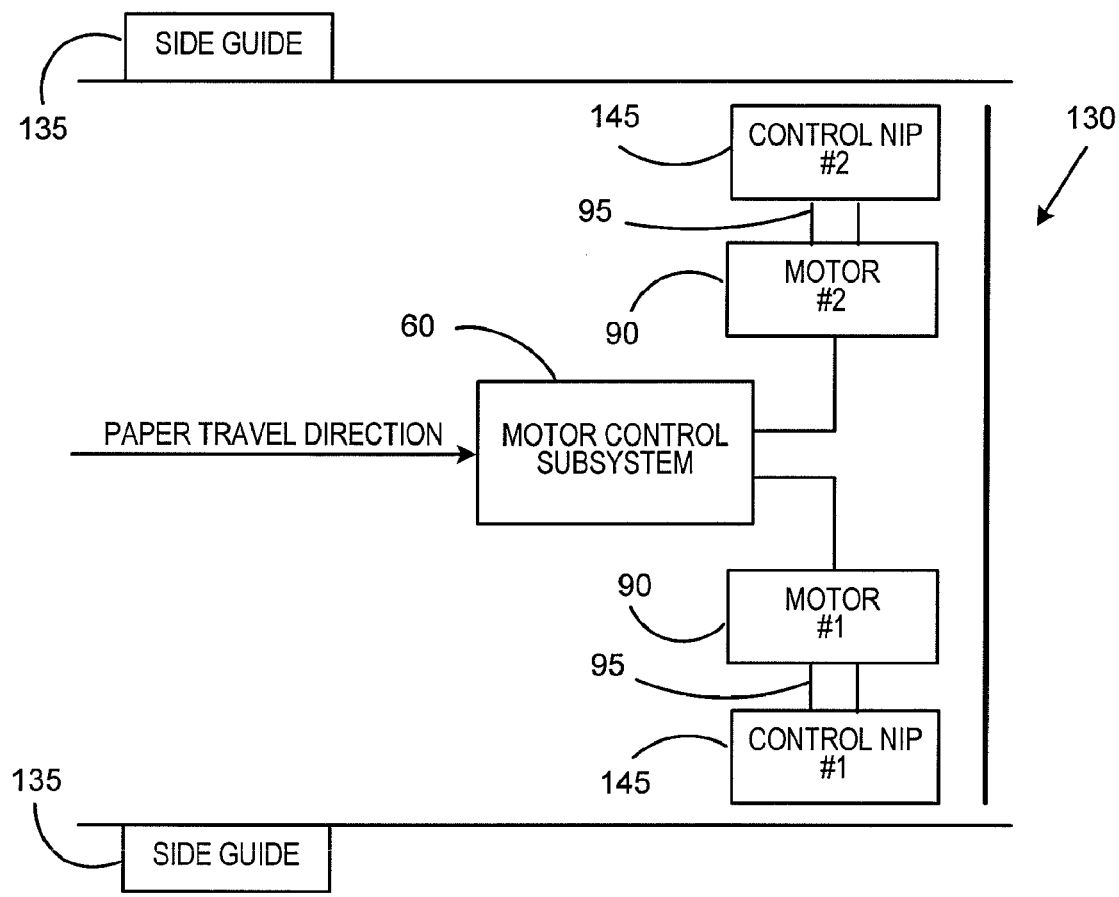
FIGS. 4A and 4B are schematic diagrams (showing top and side views, respectively) of a pinless cutter which may form a part of an inserter system or another paper handling system according to a further aspect of the present invention.
Figure 4B:
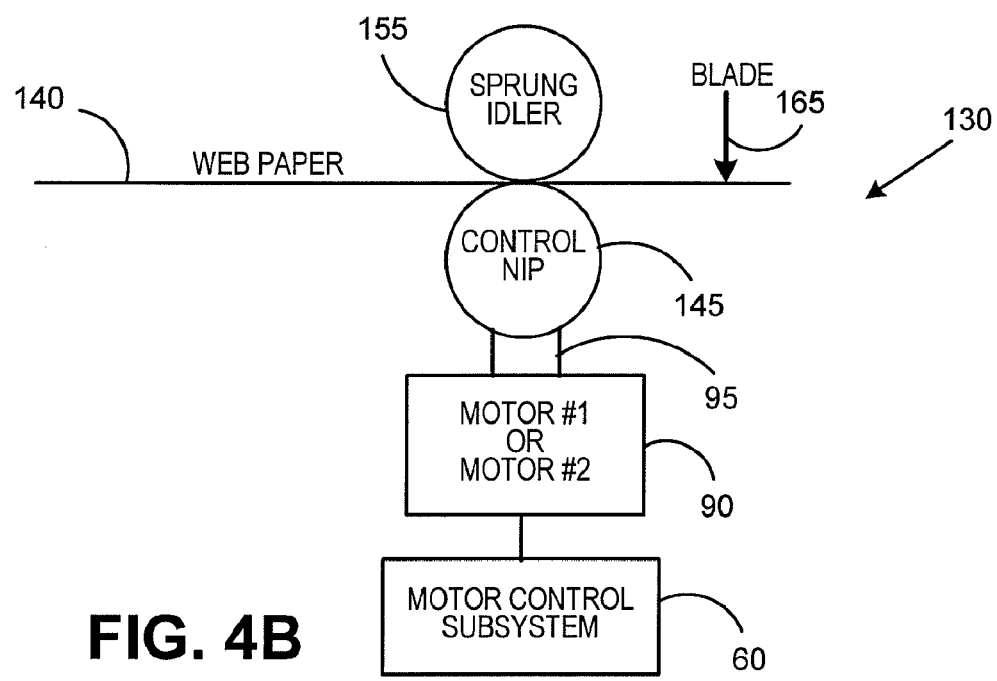

Specifically, FIGS. 4A and 4B are schematic diagrams (showing top and side views, respectively) of a pinless cutter 130 which may form a part of an inserter system or another paper handling system according to a further aspect of the present invention. The pinless cutter 130 includes side guides 135 which provide lateral positioning of the paper web 140. The side guides 135 are located upstream from first and second control nips 145. As seen in FIG. 4A, each control nip 145 is operatively coupled to and driven by a respective motor 90 of the motor control subsystem 60 through the associated output shaft 95. As seen in FIG. 4B, each control nip 145 cooperates with a respective sprung idler 155 in order to convey the paper web 140 along the pinless cutter 130 so that it may be cut by a blade 165.

A variety of mechanical differentials are known in the art. One type of mechanical differential is known as a limited slip differential. In a limited slip differential, the side gears of the differential are coupled to the carrier via a stack of clutch plates which limits the velocity difference between the two output shafts. Thus, in a limited slip differential, the speed and torque difference between its two outputs is limited. As such, a limited slip differential ensures that some torque is always distributed to both output shafts (e.g., both wheels of a vehicle), even when one shaft may be driving a load that is, for example, experiencing slippery conditions.

Another type of mechanical differential that is known in the art is known as a locking differential. A locking differential employs a mechanism which allows the planetary gears of the differential to be locked relative to one another, causing both output shafts of the differential to turn at the same velocity regardless of which one has more traction. This is equivalent to removing the differential completely.

According to a further aspect of the present invention, these mechanical solutions (i.e., a limited slip differential and a locking differential) may be simulated by the control scheme of the present invention. One potential application of this aspect of the invention is an implementation wherein the electronic differential functionality provided by the motor control subsystem 60 shown in FIG. 3 may be used to selectively lock and unlock the control nips 145 of the pinless cutter 130 shown in FIGS. 4A and 4B.

In particular, during a web advance motion, allowing the motor control subsystem 60 to be "unlocked" and operate as described elsewhere herein provides all of the benefits described previously. However, during the actual cut operation wherein the paper web 140 is cut by the blade 165 (and the web 140 is at rest), the web may move or skew due to the external forces imparted on the web 140 by the blade 165 during the physical cut. When the motor control subsystem 60 is in an unlocked condition as just described and the commanded motion is zero velocity, each control nip 145 can rotate in equal and opposite directions with little resistive holding force. To introduce a holding force during the cutting operation, it may be advantageous to be able to "lock" the motor control subsystem 60 so that the web 140 cannot move during the cutting operation.

According to an aspect of the present invention, a limited slip differential can be simulated in the motor control subsystem 60 by employing an algorithm that allows the DAC value that is provided to the power stages 80 to not necessarily be equal to one another (as was the case in the implementation of the motor control subsystem 60 described elsewhere herein in connection with FIG. 3). This can be accomplished by measuring the difference in actual angular velocity (using, for example, a tachometer) between the two output shafts 95 and applying a proportionally greater DAC value to the power stage 80 that is associated with the output shaft 95 that is rotating more slowly. Such a method can be used to imitate the properties of an infinitely adjustable limited slip differential, whereby properties can range from that of a pure mechanical differential all the way to that of a locking differential without the need for mechanical gear sets and hardware. In order to implement this simulated limited slip differential, it may be necessary to calculate a DAC value for each power stage 80, referred to herein as DAC1 and DAC2, respectively. The following equations may be used to calculate the DAC1 and DAC2 values:

$$DAC1=DAC'(1-\gamma((\omega1-\omega2)/(\omega1+\omega2)))$$

$$DAC2=2(DAC')-DAC1,$$

wherein DAC' is the relative uncompensated DAC output from the digital filter 75 before manipulation for the limited slip function, DAC1 is the relative DAC value input into the first power stage 80, DAC2 is the relative DAC value input to the second power stage 80, $\gamma$ is the limited slip coefficient having a value between zero and one, $\omega1$ is the actual velocity of the first output shaft 95, and $\omega2$ is the actual velocity of the second output shaft 95.

As noted above, the limited slip coefficient, $\gamma$, can be any value between and including zero and one. When it is set to zero, the motor control subsystem 60 behaves like a pure differential. When it is set to one, the motor control subsystem 60 behaves like a pure locking differential (the output shafts 95 will rotate at the same velocity). All of the values between zero and one cause the motor control subsystem 60 to behave like a differential with varying and proportional degrees of limited slip. FIG. 5 is a table that shows tabulated relative output DAC values using these equations as a function of relative actual velocities of the output shafts 95.

Figure 6:
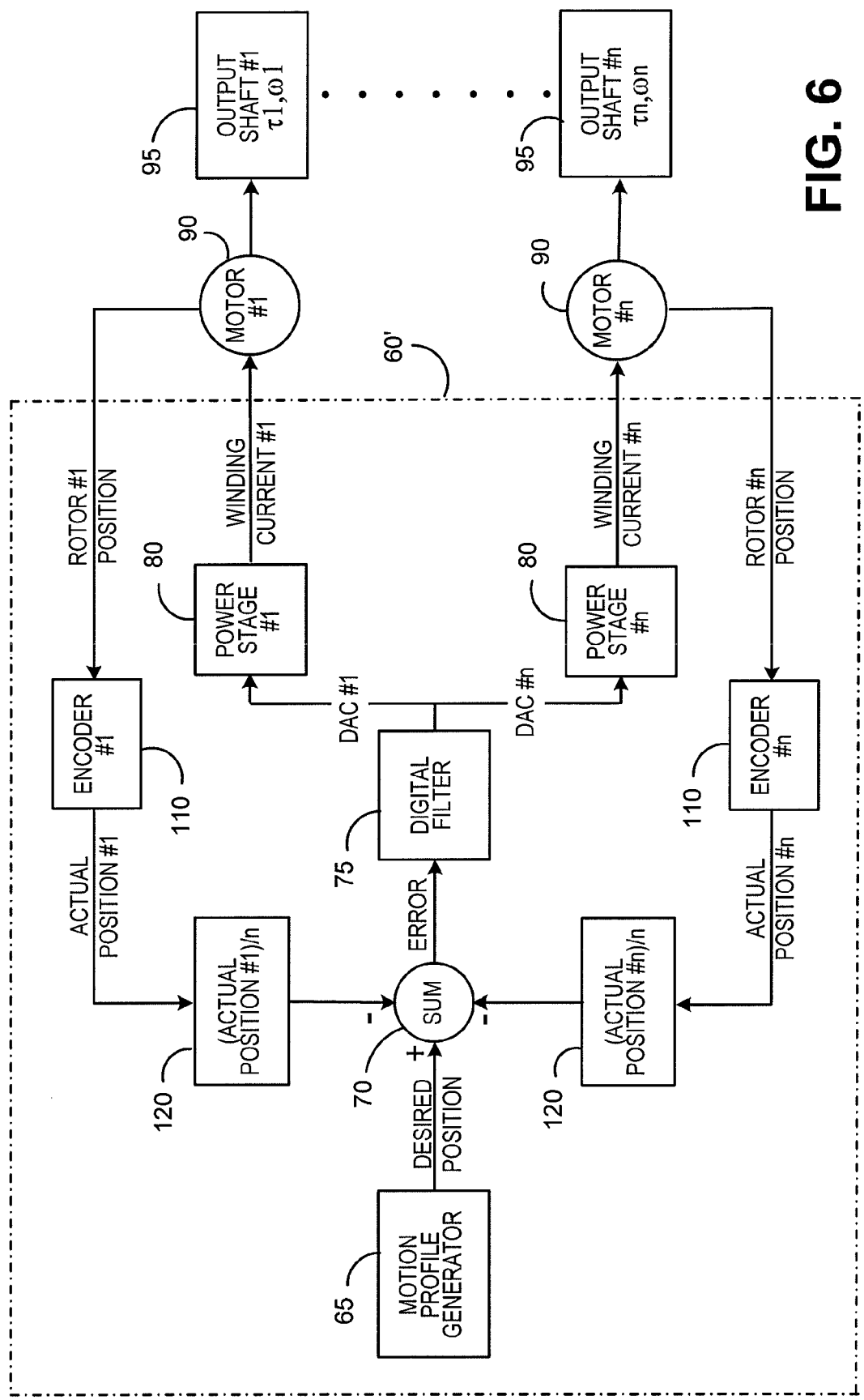
FIG. 6 is a is a block diagram of a motor system according to a further embodiment of the present invention wherein n motors are included.

Furthermore, the implementation of the motor control subsystem 60 is not limited to just two motors and two output shafts as shown in FIG. 3. Instead, as shown in FIG. 6, the same closed loop system may be implemented with n motors and n corresponding output shafts. In such an implementation, indicated by the reference numeral 60' in FIG. 6, where n motors are present, a single digital filter 75 and n subsystems including a power stage 80, a motor 90, an output shaft 95 and an encoder 110 would be employed.

In this implementation, as in the implementation shown in FIG. 3, the same DAC value output by the digital filter 75 is input into each of the n power stages 80 so that each power stage 80 may then generate a corresponding winding current for the associated motor 90. In addition, each such subsystem would include an associated actual position divider 120 wherein the actual rotor position measured by the associated encoder 110 is divided by n and input into the summing junction 70. Thus, as a result, the average actual position of each of the n rotors of the n motors 90 is input into the summing junction 70 and is compared to the desired position form the motion profile generator 65 in order to generate the position error that is input into the digital filter 75. As described above with reference to FIG. 3, other motor motion attributes, such as, for example, velocity or acceleration, may be used as the feedback mechanism in the subsystem 60' shown in FIG. 6.

Figure 7A:
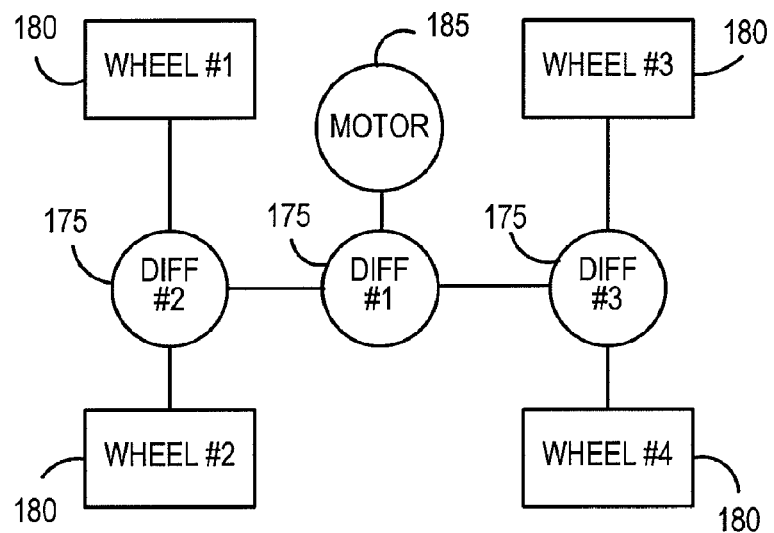
FIG. 7A is a schematic diagram of a prior art 4-wheel drive vehicle.

As is known in the art, mechanical limited slip differentials and mechanical locking differentials are widely used in automotive applications and are primarily used to provide additional propelling forces in slippery conditions. As shown in FIG. 7A, an existing 4-wheel drive vehicle 170 will typically have at least a first mechanical differential 175 for a first pair of wheels 180 and a second mechanical differential 175 for a second pair of wheels 180. In addition, a third mechanical differential 175 is also often provided to apportion power from the motor 185 between the front and rear axle of the 4-wheel drive vehicle 170 as shown in FIG. 7A.

Figure 7B:
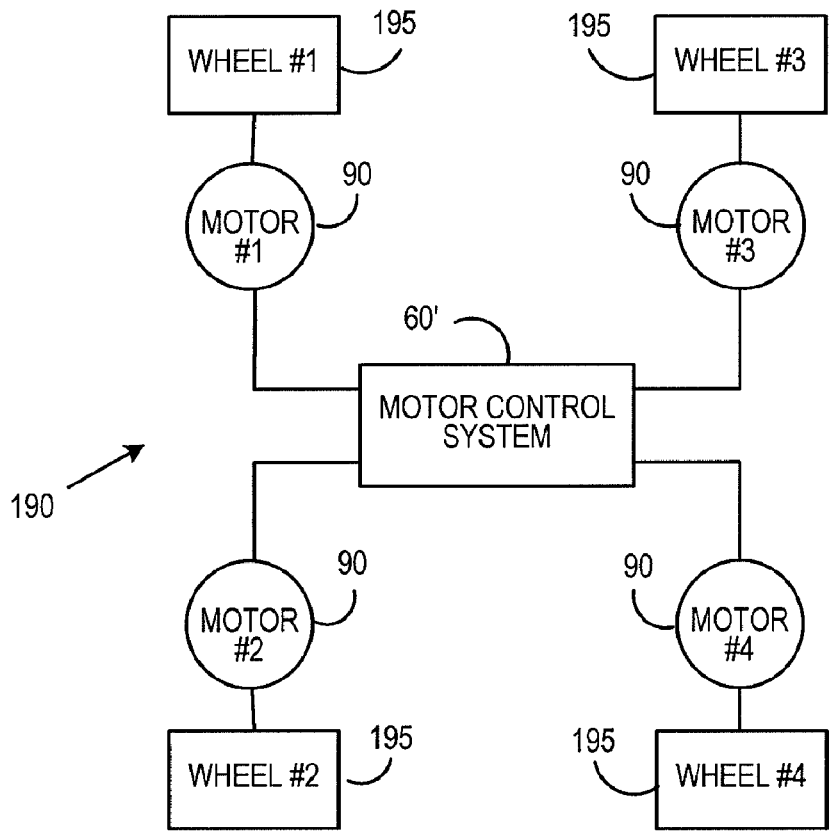
FIG. 7B is a schematic diagram of a 4-wheel drive vehicle according to a further embodiment of the invention.

FIG. 7B is a schematic diagram of a 4-wheel drive vehicle 190 according to a further embodiment of the invention. As seen in FIG. 7B, the 4-wheel drive vehicle 190 includes four wheels 195. In addition, a separate motor 90 is operatively coupled to each wheel 195 through a respective output shaft 95 in order to independently drive each wheel 195. As seen in FIG. 7B, the 4-wheel drive vehicle 190 is implemented using the motor control subsystem system 60' shown in FIG. 6 such that each motor 90 is coupled to an associated power stage 80 for receiving an input from the digital filter 75. In addition, each motor 90 has an associated encoder 110 and actual position divider 120 for causing an average actual position of the motors 90 to be the input into the summing junction 70. As a result, the 4-wheel drive vehicle 190 shown in FIG. 7B will, through the implementation of the motor control subsystem 60', have the functionality of a mechanical differential without the need to include the gears and other hardware associated with mechanical differentials as is the case in the vehicle 170 shown in FIG. 7A.

For the motor control subsystem 60' shown in FIG. 6, equations analogous to the equations provided elsewhere herein for providing limited slip differential functionality may be readily generated to provide the desired limited slip properties for such a system that includes multiple (i.e., more than two) output shafts 95. Furthermore, the DAC values generated by the digital filter 75 may be reapportioned in the real time processor before reaching their respective power stages 80 to provide unequal torque distribution to, for example, the front and rear axial of a vehicle such as the 4-wheel drive vehicle 190 shown in FIG. 7B.

It will be apparent to those skilled in the art that various modifications and variations can be made to the structure and methodology described herein. Thus, it should be understood that the invention is not limited to the examples discussed in the specification. Rather, the present invention is intended to cover modifications and variations.

What is claimed is:

1. A method of controlling a plurality of motors based on a motor motion attribute, each of the motors being driven by a corresponding power stage, the method comprising:
    generating a single desired value of the motor motion attribute for the plurality of motors;
    determining a current actual value of the motion attribute for each of the motors;
    generating an attribute error based on the desired value and an average of the current actual values for the plurality of motors;
    generating a correction value based on at least the attribute error;
    providing the correction value to each of the power stages;
    using the correction value, generating in each of the power stages an output for driving the motor corresponding to the power stage; and
    driving each of the motors using the output generated for the motor,
    wherein basing the attribute error on the single desired value of the motor motion attribute and on the average of the current actual values for each of the motors equilibrates the output of each motor and causes the combined output of the motors to be proportional to the single desired value of the motor motion attribute.

2. The method according to claim 1, wherein the motor motion attribute is chosen from motor rotor position, motor rotor velocity, and motor rotor acceleration.

3. The method according to claim 1, wherein the output for driving each of the motors is one of a winding current and a voltage.

4. The method according to claim 1, wherein generating a correction value comprises employing proportional integral derivative techniques to generate the correction value based on at least the attribute error.

5. The method according to claim 1, wherein the plurality of motors comprises more than two motors.

6. The method according to claim 1, wherein each of the motors drives a control nip of a portion of a paper handling system.

7. The method according to claim 1, wherein the plurality of motors is four motors, wherein each of the motors drives a respective wheel of a vehicle.

8. A motor system, comprising:
    a plurality of motors, each of the motors being driven by a corresponding power stage; and
    a processing device operatively coupled to each of the power stages, the processing device being adapted to control the motors based on a motor motion attribute by:
    generating a single desired value of the motor motion attribute for the plurality of motors;
    determining a current actual value of the motion attribute for each of the motors;
    generating an attribute error based on the desired value and an average of the current actual values for the plurality of motors;

generating a correction value based on at least the attribute error; and providing the correction value to each of the power stages;

wherein each of the power stages generates an output for driving the motor corresponding to the power stage using the correction value, and wherein each of the motors is driven using the output generated for the motor, and wherein basing the attribute error on the single desired value of the motor motion attribute and on the average of the current actual values for each of the motors equilibrates the output of each motor and causes the combined output of the motors to be proportional to the single desired value of the motor motion attribute.

9. A paper handling system, comprising:

a plurality of control nips for moving paper;

a plurality of motors, each of the motors being driven by a corresponding power stage, wherein each of the motors drives a respective one of the control nips; and a processing device operatively coupled to each of the power stages, the processing device being adapted to control the motors based on a motor motion attribute by:

generating a single desired value of the motor motion attribute for the plurality of motors;

determining a current actual value of the motion attribute for each of the motors;

generating an attribute error based on the desired value and an average of the current actual values for the plurality of motors;

generating a correction value based on at least the attribute error, and providing the correction value to each of the power stages, wherein each of the power stages generates an output for driving the motor corresponding to the power stage using the correction value, and wherein each of the motors is driven using the output generated for the motor, and wherein basing the attribute error on the single desired value of the motor motion attribute and on the average of the current actual values for each of the motors equilibrates the output of each motor and causes the combined output of motors to be proportional to the single desired value of the motor motion attribute.

10. The paper handling system according to claim 9, wherein the paper handling system comprises a pinless cutter having a blade, wherein the control nips are part of the pinless cutter, wherein the paper is a web of paper, and wherein the control nips when being driven by the motor move the web of paper into a position to be cut by the blade.

11. A vehicle, comprising:

a plurality of wheels;

a plurality of motors, each of the motors being driven by a corresponding power stage, wherein each of the motors drives a respective one of the wheels; and a processing device operatively coupled to each of the power stages, the processing device being adapted to control the motors based on a motor motion attribute by:

generating a single desired value of the motor motion attribute for the plurality of motors;

determining a current actual value of the motion attribute for each of the motors;

generating an attribute error based on the desired value and an average of the current actual values for the plurality of motors;

generating a correction value based on at least the attribute error; and providing the correction value to each of the power stages;

wherein each of the power stages generates an output for driving the motor corresponding to the power stage using the correction value, and wherein each of the motors is driven using the output generated for the motor, and wherein basing the attribute error on the single desired value of the motor motion attribute and on the average of the current actual values for each of the motors equilibrates the output of each motor and causes the combined output of the motors to be proportional to the single desired value of the motor motion attribute.

12. The method according to claim 11, wherein the motor motion attribute is chosen from motor rotor position, motor rotor velocity, and motor rotor acceleration.

13. The method according to claim 11, wherein the output for driving each of the motors is one of a winding current and a voltage.

14. The method according to claim 11, wherein the step of generating a compensated correction value comprises employing proportional integral derivative techniques to generate the compensated correction value based on at least the attribute error.

* * * * *